United States Patent [19]

Castelli et al.

[11] 4,001,892
[45] Jan. 4, 1977

[54] CONTAMINANT TRAPPING IN ROTATING DISK DEVICES

[75] Inventors: Vittorio Castelli, Scottsdale, N.Y.; Stephen T. Chai, Carson, Calif.

[73] Assignee: Xerox Corporation, Stamford, Conn.

[22] Filed: Mar. 17, 1975

[21] Appl. No.: 558,994

[52] U.S. Cl. .................. 360/133; 55/400; 134/4; 134/33; 134/42; 274/47; 360/137
[51] Int. Cl.$^2$ .................................. G11B 23/02
[58] Field of Search .................. 134/4, 6, 8, 33, 42; 360/133, 137; 55/400, 274, DIG. 24; 209/45, 49, 222; 274/47

[56] References Cited
UNITED STATES PATENTS

| | | | |
|---|---|---|---|
| 1,917,857 | 7/1933 | Searles | 55/DIG. 24 |
| 3,284,361 | 11/1966 | Rocchini et al. | 55/DIG. 24 |
| 3,646,724 | 2/1972 | Peck | 55/274 |
| 3,765,941 | 10/1973 | Gordon | 134/6 X |
| 3,839,734 | 10/1974 | George et al. | 360/137 X |

*Primary Examiner*—S. Leon Bashore
*Assistant Examiner*—Marc L. Caroff
*Attorney, Agent, or Firm*—J. E. Beck; T. J. Anderson; L. Zalman

[57] ABSTRACT

An apparatus for removing contaminant particles from an enclosure containing a rotating magnetic disk by using the air flow created by rotation of the disk. A tacky substance is provided at a point of maximum centrifugal force within the enclosure so that contaminant particles are permanently captured. Means can be provided for refreshing the tacky substance.

2 Claims, 2 Drawing Figures

CONTAMINANT TRAPPING IN ROTATING DISK DEVICES

BACKGROUND OF THE INVENTION

Data processing equipment often utilizes magnetic disks as the information storage medium. In such equipment, the information is stored on magnetic surfaces of the disk which is rotated at a high speed in an enclosure with access to the magnetic surfaces by way of a plurality of read/write transducer heads that generally move radially in relation to the disk surfaces. To achieve maximum magnetic coupling between the magnetic surfaces and the transducer heads, the transducer heads are positioned extremely close to the surfaces of the disk and, in fact, each "files" on an air cushion a few tenths of microinches off the surfaces of the magnetic disk. The magnetic disk enclosure is a closed system and is generally assembled in a clean room to exclude foreign particles from the interior of the enclosure to the greatest possible extent. However, some contaminant particles are generally still present in the assembly room and these contaminant particles may find their way into the enclosure. Other particles may be generated by the rubbing action of heads and disk surfaces during starting and stopping. With the disk rotating at a minimum of 1500 revolutions per minute, the heads "flying" close to the disk surfaces, and high recording densities of 100 tracks per inch and an excess of 1000 bits per inch, microscopic particles, although invisible to the naked eye, may disturb the flight of the heads and cause damaging collisions between the heads and the disk surfaces which may cause scratching of the disk surfaces and destroy, or at least substantially impair, the operability of the system.

Various means have been investigated to remove contaminant particles from the surfaces of a magnetic disk. One prior art technique is to move a flexible comb or brush lightly across a surface of the disk after the disk has been brought up to operating speed. The fibers can sweep the particles off the disk or merely dislodge the particles from the disk so that the particles are thrown off the disk by centrifugal force or carried off by the viscious drag force of the air flow directed radially across the surface of the disk. In addition, air may be forced by a fan across the surface of the disk to further aid in removing dislodged particles from the disk surface.

In another type of contaminant particle trapping system, a rotating magnetic disk is used to set up areas of different static pressures of the fluid (air) within the disk enclosure, with a first area having a first static pressure and a second area having a second static pressure less than the first static pressure by an amount sufficient to carry particles in the fluid from the first area to the second area through an external conduit. The conduit contains an absolute filter which collects all particles over a selected size, for example, all particles over 20 microinches.

Neither of the methods described adequately remove contaminant particles from the disk enclosure. In the method where the contaminant particles are merely loosened, or flung off the disk surface by centrifugal force, the contaminant particles are not permanently captured but are allowed to circulate in the air within the enclosure. Due to the close spacing between the transducer heads and the disk surfaces, the air borne particles can find their way between the transducer heads and the disk surfaces with resulting interference with the read/write operation and possibly permanent scratching of a disk surface. Also, since the contaminant particles are not permanently captured, the particles will settle on the disk surface when the disk stops rotating, necessitating further brushing of the disk surface when the disk is again used. Also, the brushing may continue for a relatively long period, for example about 20 seconds, thereby causing a serious loss of operating time when disks are changed often. In the method where the rotating disk creates a pressure differential to force contaminant particles through a filter, it is difficult to maintain an air flow through the filter due to the large back pressure developed when the filter is an absolute filter designed to remove all particles over 20 microinches in diameter.

OBJECT OF THE INVENTION

It is an object of the present invention to provide a means for removing substantially all floating contaminant particles from the internal environment of a magnetic disk enclosure.

SUMMARY OF THE INVENTION

In accordance with the invention, contaminant particles are removed from the enclosure of a rotating magnetic disk without resort to pumping air through a filter and without bringing any brushing apparatus into contact with the disk surface. Filtration is achieved by creating, due to the rotary motion of the disk, an induced flow of the gas (air) across the surfaces of the rotating disk. At the periphery of the disk the gas follows a curved path, with the centrifugal force field generated as a result of the curved path tending to separate outwardly contaminant particles of densities higher than the entraining gas. At the portion of the curved path where the separation tendency is most pronounced, a surface of the enclosure is provided with a substance that will permanently capture or trap any particles coming in contact therewith due to the high centrifugal force on these particles at that portion of the curved path. The trap is implemented by a tacky substance, such as a high vacuum grease, with provision being made for periodically exposing a clean surface of the substance to the environment of the disk enclosure.

DESCRIPTION OF THE PREFERRED EMBODIMENTS

Figure 1:
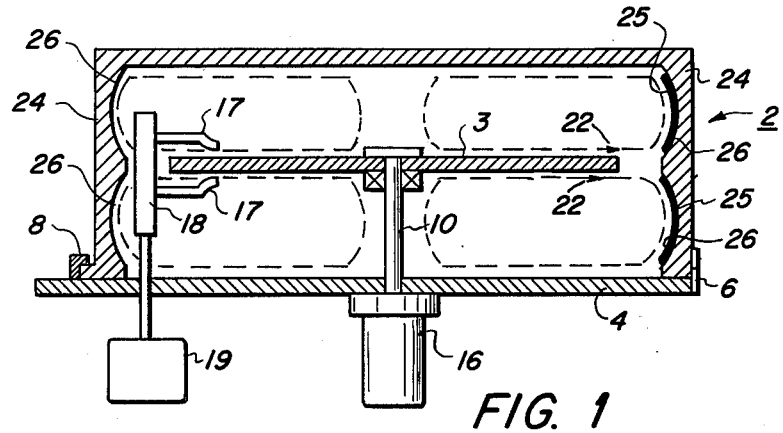
FIG. 1 is a cross-sectional view of apparatus embodying the present invention.

Referring to FIG. 1, there is shown a cross-section of a housing or enclosure 2 which contains a magnetic disk 3. Housing 2 consists of a back plate 4 which supports a fluid-tight cover which may be hinged to the back plate at 6 and provided with a clamping mechanism at 8. In a well known manner, the disk 3 is supported by and mechanically coupled to a rotatable spindle 10 which is driven by a motor generally indicated at 16. Read/write transducer heads 17 are positioned adjacent the surfaces of disk 3 by means of a conventional rack and pinion arrangement 18 which is coupled to a conventional positioning servo motor 19.

It is assumed that the closed system of FIG. 1 was assembled in a clean room in an attempt to eliminate foreign particles from the interior of the enclosure 2. However, in practice it is found that particles of foreign matter find their way into the interior of the enclosure 2, even though the system was assembled in a clean room and these particles may cause failure of the system in the manner previously described. Thus, it is desirable to remove these foreign particles that remain in the enclosure 2 after assembly.

The transducer heads 17 may be of the type known as "Winchester" heads. At the operating speed of the disk 3, such as 1200 revolutions per minute, the heads 17 ride, or "fly," over the adjacent surfaces of disk 3 on a thin, dynamic film of air created due to relative motion of heads 17 and disk 3. The viscous drag of the disk, depicted as segmented arrows 22, drags air into the space between the disk 3 and the transducer heads 17 to provide an air-bearing interface which builds up sufficient pressure to support the heads 17 off the adjacent surfaces of the disk against the bias force of springs (not shown). Typically, each head 17 flys 50 to 100 microinches from he adjacent surface of the disk 3.

The air flow or current causes removal of foreign particles from the interior of the enclosure 2. Rotation of disk 3 causes very large centrifugal forces to act within the enclosure 2. Since the contaminant or foreign particles have a high density as compared to the density of the fluid medium (air) within the enclosure 2, the particles undergo a motion relative to that of the fluid medium entrained by the rotating disk under the action of the centrifugal forces. This causes the particles to move outwardly toward the periphery of the disk 3. This means that the contaminant particles essentially follow the fluid in a direction tangential to the disk surface while they flow radially outward to the periphery of the disk 3.

Once at the periphery of disk 3, the contaminant particles will attempt to follow the curved path that the entrained air follows. However, due to their relatively high density the particles cannot follow the curved path and, due to the centrifugal force acting thereon, are flung against the side walls 24 of the enclosure 2. A tacky substance 25 is coated on the side walls 24 of the enclosure 2 such that the contaminant particles are captured when they are flung thereagainst. The tacky substance may be a high vacuum grease or any conventional adhesive that will not dry readily due to the air current flowing thereby. The tacky substance may also be a sticky tape.

The centrifugal force acting on contaminant particles which have moved adjacent the side walls 24 will be greatest at the point where the particles have cause to make abrupt directional changes since centrifugal force is inversely proportional to radius of curvature. Accordingly, in accordance with the invention, the interior surface of the side walls 24 of the enclosure 2 can be curved, as shown in FIG. 1, with toroidal surfaces 26 above and below the surfaces of the disk 3, and with the tacky substance 25 applied to the toroidal surfaces or parts of the toroidal surfaces. By toroidal surface it is meant a surface generated by a plane curve rotated about the axis of spindle 10. The curve can be a segment of a circle, ellipse or any other desired geometric shape. For example, with the disk 3 having a diameter of 12 inches, surfaces 26 can have a cross-section that is a segment of a circle having a diameter of 2 inches.

The apparatus described will remove contaminant particles using only the air flow created by rotation of disk 3. Since no filter mechanism is used, the filtering is provided cheaply and can remove small contaminant particles. Also, since there is no wiping of the disk surfaces there is no possibility of scratching of the disk surfaces and more efficient use of the disk can be made since there is no initial time spent in sweeping the disk surfaces. Further, the apparatus of the invention permanently removes contaminant particles from the housing, thereby not requiring cleaning of the housing with each use of the disk as is the case of devices which merely brush off the disk and do not collect the dislodged particles.

Figure 2:
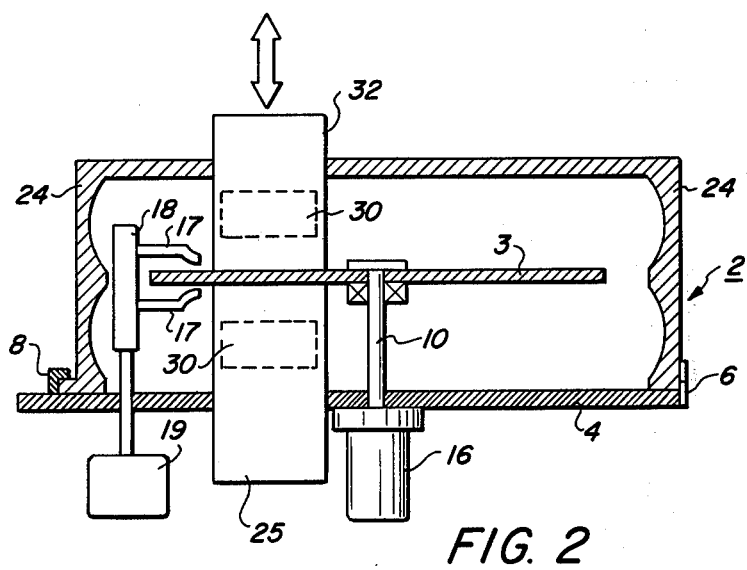
FIG. 2 is a cross-sectional view of an alternate embodiment of the apparatus of the present invention.

In some instances, the tacky substance 25 may get so impregnated with contaminant particles that it is no longer highly effective as a contaminant trap. FIG. 2 illustrates an apparatus in which the tacky substance can be refreshed. Portions of the enclosure 2 are provided with apertures 30 and the portions of the enclosure adjacent the apertures 30 are provided with channels (not shown) which slidably support plate 32, which is of greater length than apertures 30 and is curved to form a portion of the side walls of enclosure 2. Plate 32 has a tacky substance 25 over its entire length. If the portion of the tacky substance effectively within the housing 2 becomes ineffective for some reason, the plate 32 can be moved (as shown by the arrows) so that a fresh area of the tacky substance is effectively within the enclosure 2. The tacky substance may have a protective coating, such as a waxy paper, so that it is not contaminated prior to movement into the enclosure 2. Obviously, the protective coating is removed from each area of the tacky substance prior to its becoming an effective part of the enclosure 2.

We claim:

1. A data storage system providing an ambient fluid free of contaminant particles comprising:

a magnetic disk supported for rotation about a spindle and having at least one surface capable of storing information, a housing for enclosing said magnetic disk, the interior side surface of said housing being proximate the periphery of said magnetic disk, at least a portion of said interior side surface of said housing being curved relative to the axial direction of said spindle, said housing being fluid tight when the said data storage system is in operation such that the ambient fluid within said housing remains the same when said data storage system is in operation, means for rotating said magnetic disk, rotation of said magnetic disk producing a centrifugal force within said housing which force causes the ambient fluid and any contaminant particles carried thereby to flow past the outer periphery of said at least one surface of said magnetic disk and past said portion of said interior side surface of said housing, said centrifugal force being greatest adjacent said portion of said interior side surface of said housing due to said portion of said side surface of said housing being curved relative to the axial direction of said spindle, and a tacky substance deposited on at least a portion of said portion of said interior side surface of said housing, the action of the centrifugal force produced by rotation of said magnetic disk causing contaminant particles carried by the ambient fluid within said housing to be flung against said tacky substance as said ambient fluid within said housing moves past said tacky substance whereby said contaminant particles are permanently captured by said tacky substance.

2. The system of claim 1 wherein said tacky substance is a high vacuum grease.

* * * * *